(12) United States Patent
Rupnik

(10) Patent No.: US 8,374,736 B1
(45) Date of Patent: Feb. 12, 2013

(54) RUNWAY SLOPE COMPENSATION FOR AN AUTOMATIC LANDING SYSTEM

(75) Inventor: Brian K. Rupnik, Seattle, WA (US)

(73) Assignee: The Boeing Company, Chicago, IL (US)

( * ) Notice: Subject to any disclaimer, the term of this patent is extended or adjusted under 35 U.S.C. 154(b) by 271 days.

(21) Appl. No.: 12/629,101

(22) Filed: Dec. 2, 2009

(51) Int. Cl.
*G06F 19/00* (2006.01)

(52) U.S. Cl. .......................................................... 701/17
(58) Field of Classification Search .................. None
See application file for complete search history.

(56) References Cited

U.S. PATENT DOCUMENTS

| | | | | |
|---|---|---|---|---|
| 3,807,666 A | * | 4/1974 | Devlin | 244/194 |
| 3,976,267 A | * | 8/1976 | Meyer et al. | 244/186 |
| 5,377,937 A | * | 1/1995 | LaMay et al. | 244/185 |
| 5,475,393 A | * | 12/1995 | Heinzerling | 342/410 |
| 6,450,456 B1 | * | 9/2002 | Greene | 244/186 |
| 6,575,410 B2 | * | 6/2003 | Greene | 244/186 |
| 6,676,088 B1 | * | 1/2004 | Greene | 244/187 |
| 2008/0252489 A1 | * | 10/2008 | Naimer et al. | 340/971 |
| 2009/0132104 A1 | | 5/2009 | Rupnik et al. | |
| 2009/0138144 A1 | | 5/2009 | Flannigan et al. | |

* cited by examiner

*Primary Examiner* — Thomas Tarcza
*Assistant Examiner* — Adam Alharbi
(74) *Attorney, Agent, or Firm* — Charles L. Moore; Moore & Van Allen PLLC

(57) ABSTRACT

An automatic landing system (ALS) includes an automatic landing module. The automatic landing module receives a radio altitude from a radio altimeter and any other sensor inputs for use by the automatic landing module and generates an ALS elevator command. The ALS also includes a runway slope compensation (RSC) module. The runway slope compensation module receives the ALS elevator command, the radio altitude and an inertial vertical speed from an inertial reference unit and generates an aircraft elevator command and at least one symmetric wing surface command. The aircraft elevator command and the at least one symmetric wing surface command are useable by an aircraft for runway slope compensation.

20 Claims, 5 Drawing Sheets

RUNWAY SLOPE COMPENSATION FOR AN AUTOMATIC LANDING SYSTEM

BACKGROUND

The present disclosure is related to automatic landing systems, and more specifically to an automatic landing system with runway slope compensation.

The conventional automatic landing system (ALS) that uses radio altitude as a primary feedback for flaring to touchdown will tend to exhibit undesirable pitching activity when flown over sloping runways. This can cause excessively long or short landings and in extreme cases could cause the pilot to intervene and disconnect the ALS or abort the approach. Additionally, extreme pitch attitudes will cause risk of tailstrikes or nosewheel-first landings. Operationally, some facilities with sloping runways limit use of autoland systems in low visibility conditions due to poor performance.

The source of this undesirable pitch activity is the radio altitude signal which will include the effects of both the aircraft's movement and of changes in ground level due to the irregular runway profile. A sloping runway will cause the ALS to perceive greater or lesser vertical speeds relative to ground. If the ALS has conventional elevator based longitudinal control, the only way it can continue to follow the commanded landing profile is for the elevator to move in reaction to the altered vertical speed and pitch the aircraft. In effect, this changes the lift of the aircraft to account for the rise or fall of the runway.

A conventional ALS has no means to address this problem without pitching the aircraft using the elevator. Some mitigation for runway slope effects can be achieved through modifications of control law gains to dampen the control law's response to rapidly changing inputs. Similarly, nose down command limiting could be used to reduce pitch activity. However, changing control law gains or limiting the command to address pitch activity often results in degraded stability or performance. It does not address the underlying problem of the control law input reacting to both aircraft and to terrain movement with a single control surface. There is no way to decouple the pitch activity due to the runway slope from the rest of the flare profile.

SUMMARY

According to one aspect of the present disclosure, an automatic landing system (ALS) includes an automatic landing module. The automatic landing module receives a radio altitude from a radio altimeter and any other sensor inputs useable by the automatic landing module and generates an ALS elevator command. The ALS also includes a runway slope compensation (RSC) module. The runway slope compensation module may receive the ALS elevator command, the radio altitude and an inertial vertical speed from an inertial reference unit and generates an aircraft elevator command and at least one symmetric wing surface command. The aircraft elevator command and the at least one symmetric wing surface command are useable by an aircraft for runway slope compensation.

According to another aspect of the present disclosure, a method for runway slope compensation may include engaging an ALS in an approach mode. The method may also include generating a slope estimate of a runway by comparing a rate of change in radio altitude to an inertial vertical speed. The method may additionally include generating a slope estimate rate of change from at least two slope estimates. The slope estimate may be converted to an aircraft elevator command and at least one symmetric wing surface command. The slope estimate rate may be converted to an aircraft elevator command and at least one symmetric wing surface command.

According to a still further aspect of the present disclosure, an aircraft may include a radio altimeter, an inertial reference unit, and an ALS. The ALS may include an automatic landing module. The automatic landing module may receive a radio altitude from the radio altimeter and any other sensor inputs for use by the automatic landing module. The automatic landing module may generate an ALS elevator command in response to the radio altitude and any other sensor inputs. The ALS may also include a runway slope compensation module. The runway slope compensation module may receive the ALS elevator command, the radio altitude and an inertial vertical speed from an inertial reference unit. The runway slope compensation module may generate an aircraft elevator command and at least one symmetric wing surface command. The aircraft elevator command and the at least one symmetric wing surface command are useable by the aircraft for runway slope compensation during landing approach.

The features, functions, and advantages that have been discussed can be achieved independently in various embodiments of the present disclosure or may be combined in yet other embodiments further details of which can be seen with reference to the following description and drawings.

BRIEF DESCRIPTION OF THE DRAWINGS

The present disclosure is further described in the detailed description which follows in reference to the noted plurality of drawings by way of non-limiting examples of embodiments of the present disclosure in which like reference numerals represent similar parts throughout the several views of the drawings and wherein.

DETAILED DESCRIPTION

Figure 1:
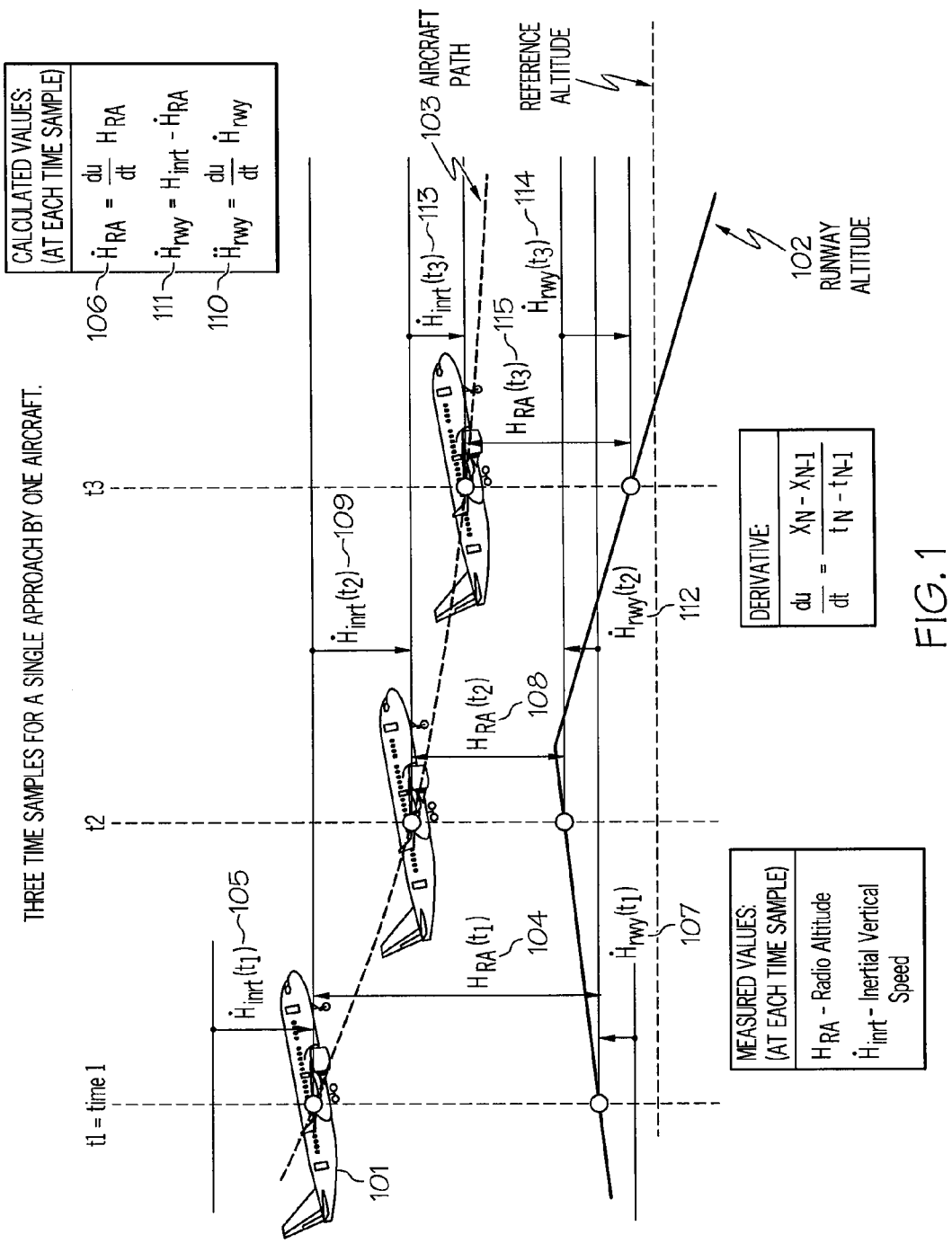
FIG. 1 is a diagram of an aircraft with an ALS according to an exemplary embodiment of the present disclosure at different stages of an approach.

The following detailed description of embodiments refers to the accompanying drawings, which illustrate specific embodiments of the disclosure. Other embodiments having different structures and operation do not depart from the scope of the present disclosure.

As will be appreciated by one of skill in the art, features of the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer readable medium(s) having computer readable program code embodies thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc. or any suitable combination of the foregoing.

Computer program code for carrying out operations of the present disclosure may be written in an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments according to the present disclosure use sensor data to improve the performance of automatic landing systems at facilities with sloping runways which would allow ALS use at more locations. Radio altitude and inertial vertical speed are used to generate an estimate of the runway slope and from that estimate generate elevator and symmetric wing surface commands. The generated elevator and symmetric wing surface commands allow the aircraft to continue following the desired landing profile while eliminating undesirable control system responses which a sloping runway may induce in many conventional automatic landing systems. An ALS according to embodiments of the present disclosure does not pitch the aircraft excessively over a changing runway profile and allows an aircraft to still meet its landing targets. Any wing surface combination may be used to achieve this compensation. The specific configuration may depend on the aircraft that the ALS was implemented for. Therefore, an ALS according to embodiments of the present disclosure estimates a runway slope and allows the combination of the elevator and wing surfaces to control pitch in order to remove detrimental affects of sloping runways.

A conventional ALS typically uses radio altitude as the primary feedback to control the vertical path and sink rate profiles needed to achieve the desired touchdown targets. The radio altitude signal includes effects both from the aircraft's movement, as well as any effects from a sloping runway. An ALS according to embodiments of the present disclosure may use a comparison of the rate of change in radio altitude to inertial vertical speed at a low altitude, and derive an estimate of vertical speed due to runway slope. To help illustrate embodiments according to the present disclosure, the term "estimate of vertical speed due to runway slope" may be simply referred to as "slope estimate". In order to achieve a smooth signal for generating a command, filtering may be applied to the slope estimate to help eliminate undesirable noise. The rate of change of the slope estimate may also be monitored to account for runways that change direction of slope.

ALS embodiments according to the present disclosure make effective use of these estimates and provide the capability to symmetrically control wing surfaces to change the lift of aircraft. The runway slope and change-of-slope estimates may be converted into both an elevator command and a delta lift command. An elevator component may be generated and used to remove the input characteristics that may normally cause pitch activity from an elevator command that may come from a conventional ALS system. The delta lift command may be passed to the wing surfaces to change the aircraft lift to account for a rising or falling runway. An ALS according to embodiments of the present disclosure does not pitch the aircraft excessively over a changing runway profile but can still meet its landing targets. Limiting functions such as, for example, dead zones, rate limits, or position limits may be implemented on the slope and change of slope estimates to constrain or bound the command signals or prevent spurious activity on the command signals caused by input signal noise.

ALS embodiments according to the present disclosure account for the runway slope using both the elevator and the wing surfaces. Accounting for the runway slope using the wing surfaces leaves the elevator free to work the flare path control task resulting in less pitch activity needed to achieve the desired touchdown targets on a sloping runway. The risk of tailstrike, nosewheel-first landings, or pilot intervention is reduced. The need to tune primary elevator gains to dampen pitch activity or limit nose down pitch commands at the expense of other performance and stability parameters is also eliminated.

An automatic landing system according to embodiments of the present disclosure may include hardware and software necessary to create the runway slope estimates, the symmetric wing surface command and the elevator command modifications. If the ALS does not directly send commands to surface actuators then a primary control system may also be included to govern surface movement. Sensors such as, for example, a radio altimeter, an inertial reference unit and an air data unit may also send inputs to the ALS according to the present disclosure to provide necessary feedbacks for the ALS control law.

An ALS according to embodiments of the present disclosure may insure that the ALS is engaged in an approach mode, compare a rate of change of a radio altitude to an inertial vertical speed to estimate the slope of a runway in terms of added vertical speed when the aircraft is at a suitably low altitude above ground, optionally apply filtering to the slope estimate, compute a rate of change of the slope estimate, optionally apply filtering to the rate of change of the slope estimate, optionally apply limiting as needed on the slope and the change of slope estimates, and may convert the filtered limited slope estimate signal and rate of change of slope estimate signal into commands for the elevator control path and the symmetric wing surface control path of the aircraft.

FIG. 1 shows a diagram of an aircraft with an ALS according to an exemplary embodiment of the present disclosure. The diagram shows an aircraft 101 that includes an ALS according to exemplary embodiments of the present disclosure descending along an aircraft path 103 towards a sloped runway 102. To help illustrate embodiments of the present disclosure, three time samples, t1, t2 and t3 will be used where flight control data is received and processed by the ALS. However, embodiments of the present disclosure are not limited to three samples as samples may be continuously taken while the aircraft is descending towards a runway.

The following nomenclature is used in FIG. 1:

$H_{RA}$=Radio altitude (104, 108, 115)
$\dot{H}_{RA}$=Rate of change in radio altitude (106)
$\dot{H}_{inrt}$=Inertial vertical speed (105, 109, 113)
$\dot{H}_{rwy}$=Vertical speed due to runway slope; the slope estimate (107, 111, 112, 114)
$\ddot{H}_{rwy}$=Change in vertical speed due to runway slope; the slope estimate rate (110)

An ALS according to embodiments of the present disclosure on board the aircraft 101 may receive a radio altitude 104 and an inertial vertical speed 105 during a first time sample t1. The ALS on board the aircraft 101 may then use this information and previous radio altitude data to compute a rate of change in radio altitude using the equation 106, for example. Further, a slope estimate (vertical speed due to runway slope) 107 may be generated by comparing the rate of change in radio altitude to the inertial vertical speed 105 using the equation 111, for example. As the aircraft 101 further descends along the aircraft path 103 towards the runway 102, new information is gathered at timeframe t2. This includes a radio altitude 108 and an inertial vertical speed 109 at time t2. A rate of change in radio altitude may be generated using the radio altitude at time t2 108 and the radio altitude at time t1 104 and equation 106. A slope estimate 112 at time t2 of the runway 102 may be generated by comparing the rate of change in radio altitude to an inertial vertical speed at time t2 109 using the equation 111. A slope estimate rate of change at time t2 may be generated from the slope estimate at time t2 112 and the slope estimate from time t1 107 using equation 110.

The slope estimate 112 may then be converted to an elevator command and one or more symmetric wing surface commands, and the slope estimate rate converted to an elevator command and one or more symmetric wing surface commands. These commands control the aircraft elevator and wing surfaces helping the aircraft 101 to make appropriate adjustments for changes in the slope of a runway 102. The slope estimate represents a vertical speed due to the runway slope and may be measured in units of position per units of time (e.g., feet per second, meters per sec, etc.). Further, the slope estimate rate may represent a change in vertical speed due to the runway slope and may be represented as, for example, feet per second squared As the airplane 101 further descends along the aircraft path 103 towards the runway 102, time t3 occurs where a slope estimate 114 may be generated for time t3 based on a rate of change in radio attitude to inertial vertical speed being calculated again based on the radio attitude at time t3 115 and the radio attitude 108 at t2 and the inertial vertical speed at time t3 113. A slope estimate rate of change at time t3 may then be generated from the slope estimate at time t3 114 and the slope estimate from time t2 112 using equation 110. The slope estimate may then be converted to a new elevator command and one or more new symmetric wing surface commands, and the slope estimate rate may be converted to a new elevator command and one or more new symmetric wing surface commands. In this exemplary embodiment, the runway changes slope once and from a positive slope to a negative slope. However, a runway may exhibit multiple directions of slope changes. Further, as noted previously, although three time samples were used to help illustrate the present disclosure, an automatic landing system according to the present disclosure may continuously gather information or take samples and make computations to generate elevator commands and one or more symmetric wing surface commands to aid the aircraft in landing on the sloped runway.

Figure 2:
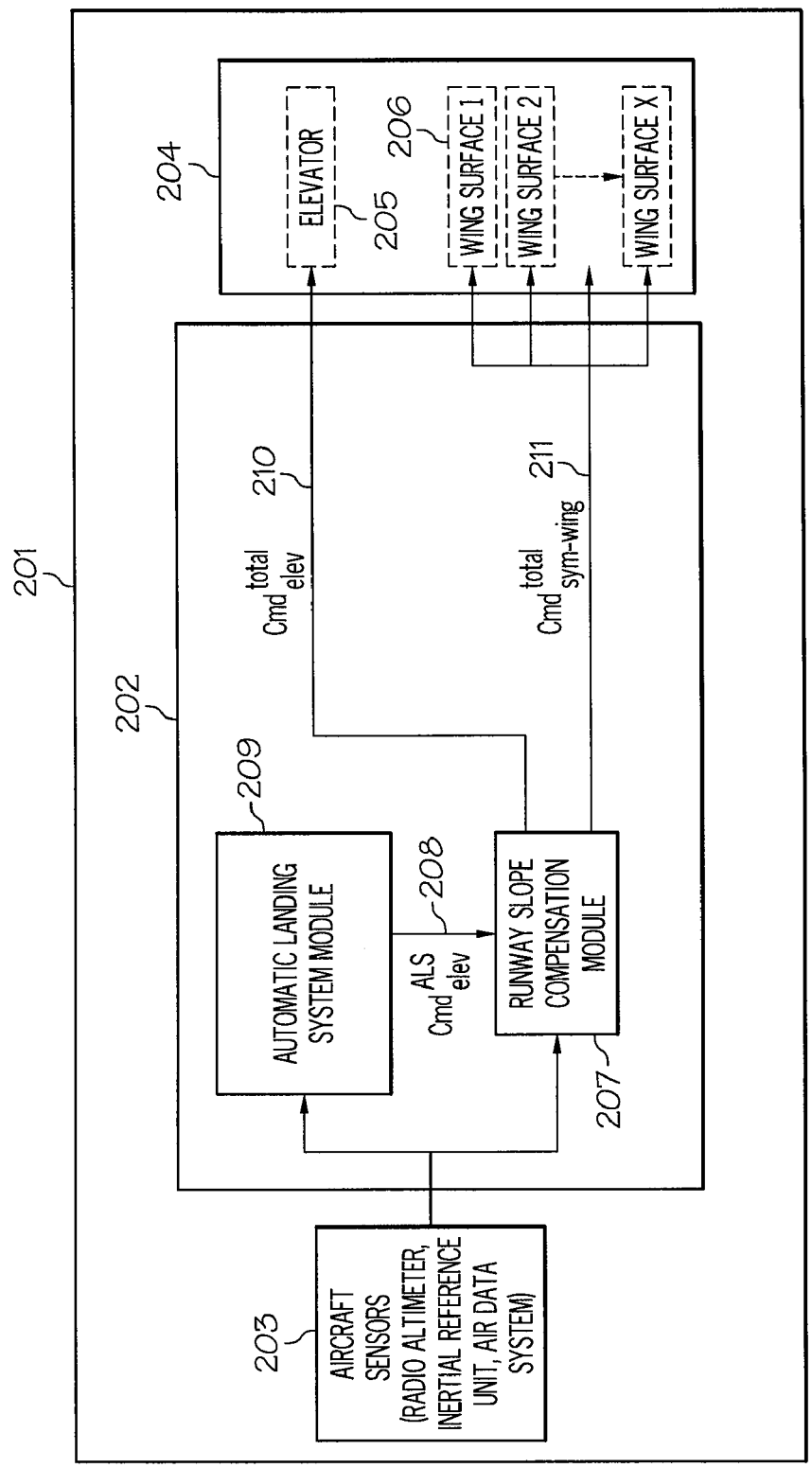
FIG. 2 is a block diagram of an automatic landing system according to an exemplary embodiment of the present disclosure.

FIG. 2 shows a block diagram of an automatic landing system 202 according to an exemplary embodiment of the present disclosure. The automatic landing system 202 may be included in an aircraft 201 that may also include different types of aircraft sensors 203 and aircraft controls 204 that control the flight of the aircraft 201. The aircraft sensors 203 may include various aircraft devices such as, for example, a radio altimeter, an inertial reference unit, an air data system, etc. Further, the aircraft controls 204 may include an elevator 205 and one or more wing surfaces 206. The wing surfaces 206 may include, for example, an aileron, a flaperon, a spoiler, etc.

The automatic landing system 202 may include an automatic landing system module 209 that receives radio altimeter data and inertial reference data from the aircraft sensors 203 and generates an automatic landing system module elevator command 208. The automatic landing system 202 may also include a runway slope compensation module 207 that receives the radio altimeter data and inertial reference data as well as the automatic landing system module elevator command 208. The runway slope compensation module 207 may then generate a runway slope compensation elevator command 210 and one or more runway slope compensation direct lift commands/symmetric wing surface commands 211. The elevator command 210 and the one or more symmetric wing surface commands 211 may then be sent to an elevator 205 of the aircraft and one or more wing surfaces 206 of the aircraft, respectively.

Figure 3:
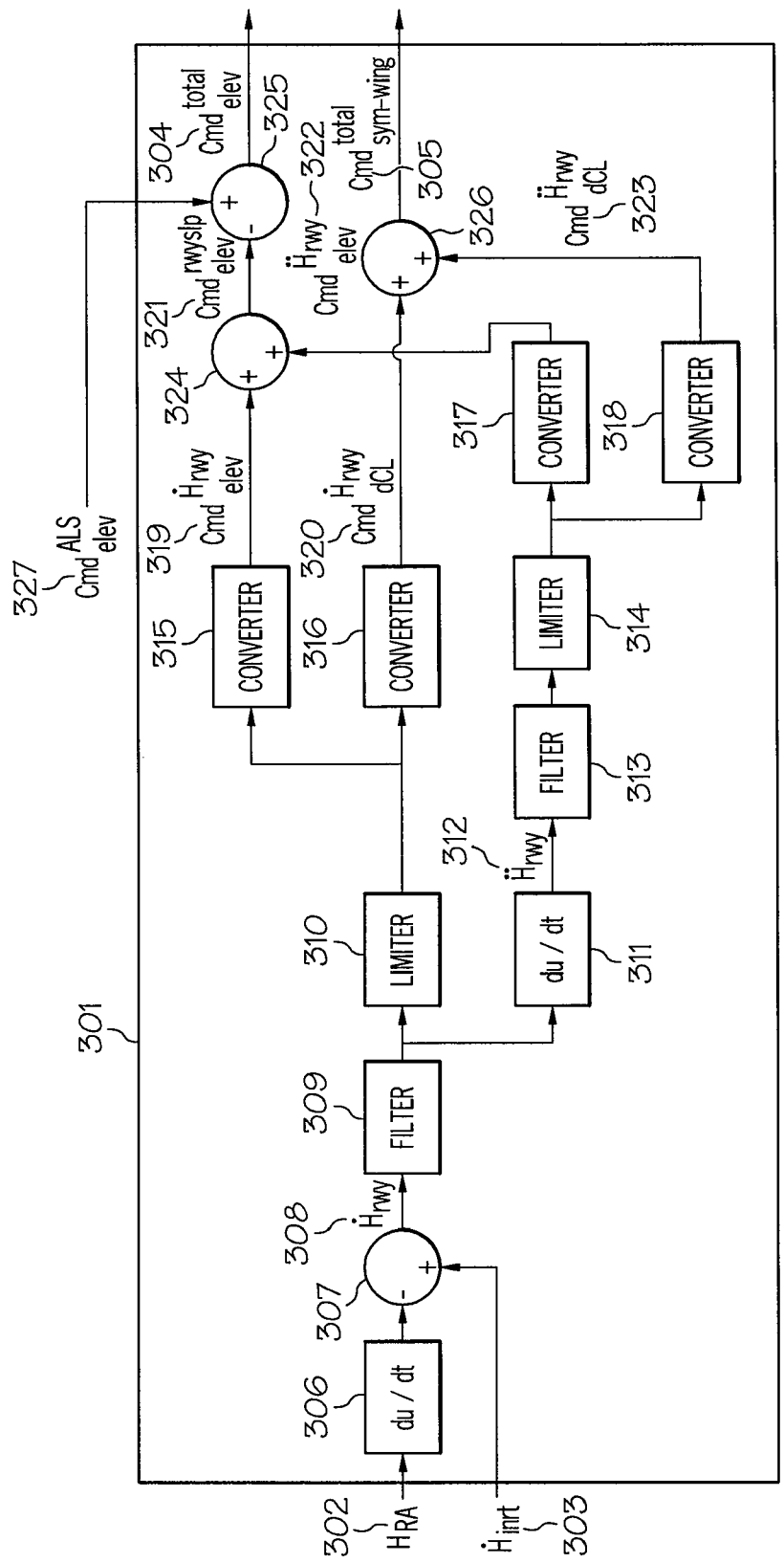
FIG. 3 is a block diagram of a runway slope compensation module according to an exemplary embodiment of the present disclosure.

FIG. 3 shows a block diagram of a runway slope compensation module 301 according to an exemplary embodiment of the present disclosure. The runway slope compensation module 301 may be used for the runway slope compensation module 207 in FIG. 2. The runway slope compensation module 301 may include one or more rate determinators 306, 311 capable of computing rate such as, for example, computing a derivative from input data. The runway slope compensation module 301 may also include one or more arithmetic logic units (ALUs) 307, 324, 325, 326, one or more filters 309, 313, one or more limiters 310, 314, and one or more converters 315-318.

The following nomenclature is used in FIG. 3:
$H_{RA}$=Radio altitude (302)
$\dot{H}_{inrt}$=Inertial vertical speed (303)
$\dot{H}_{rwy}$=Vertical speed due to runway slope; the slope estimate (308)
$\ddot{H}_{rwy}$=Change in vertical speed due to runway slope; the slope estimate rate (312)
$Cmd_{elev}^{Hrwy}$=Elevator command derived from runway slope (319)
$Cmd_{dCL}^{Hrwy}$=Direct lift command derived from runway slope (320)
$Cmd_{elev}^{\ddot{H}rwy}$=Elevator command derived from changes in runway slope (322)
$Cmde_{dCl}^{\ddot{H}rwy}$=Direct lift command derived from changes in runway slope (323)
$Cmd_{elev}^{rwyslp}$=Total runway slope compensation elevator command (321)
$Cmd_{sym-wing}^{rwslp}$=Total runway slope compensation symmetric wing surface command (305)
$Cmd_{elef}^{ALS}$=ALS Elevator command (327)
$Cmd_{elev}^{Total}$=Aircraft elevator command (304)

A first rate determinator 306 may receive a radio altitude 302 and based on one or more previously received radio altitudes, compute a rate of change in radio altitude. The rate of change may then be fed to an ALU 307 that also receives an inertial vertical speed 303. The ALU 307 may generate a slope estimate 308 of a runway by comparing the rate of change in radio altitude from the rate determinator 306 with the inertial vertical speed 303. The slope estimate 308 may be filtered as necessary in order to achieve a smooth signal by reducing any undesirable noise by a filter 309. Further, the filtered slope estimate may be received by a first limiter 310 where any of many types of limiting functions may be performed on the filtered slope estimate to prevent spurious activity on the later generated command signals from input signal noise or bound the range of the command signals. The limiting functions may include, for example, dead zones, rate limits, position limits, etc. The limited filtered slope estimate may then be received by two converters 315, 316 where a first converter 315 converts the received signal to an elevator command 319 and the second converter 316 converts the input into a direct lift command 320.

Moreover, the filtered slope estimate may be received by a second rate determinator 311 that uses the filtered slope estimate and previous filtered slope estimates to generate a slope estimate rate of change 312 that relates to a change in vertical speed due to runway slope. The slope estimate rate 312 may then be sent to a filter 313 in order to achieve a smooth signal for the later generated commands by reducing undesirable noise. The filtered slope estimate rate may further be received by a second limiter 314 that applies a limiting function as noted previously on the filtered slope estimate rate to prevent spurious activity on the command signals from input signal noise or bound the range of the command signals. The limited and filtered slope estimate rate may then be received by a third and fourth converters 317, 318. The third converter 317 may convert the received signal into an elevator command 322 derived from changes in runway slope. Further, the third converter 318 may convert the received signal into one or more direct lift commands 323 derived from changes in runway slope.

The elevator command 319 from the first converter 315 may be received by a second ALU 324 where it may be added to the elevator command 322 derived from changes in runway slope from the third converter 317. The second ALU 324 may then generate a total runway slope compensation elevator command 321 that may be received by a third ALU 325 and subtracted from another elevator command 327 received by the runway slope compensation module 301 from an automatic landing system module or a conventional automatic landing system. The third ALU 325 may then generate an aircraft elevator command 304 that may be sent to an elevator of the aircraft.

In addition, a fourth ALU 326 may receive the direct lift command 320 from the second converter 316 and add it to the direct lift command 323 derived from changes in runway slope from the fourth converter 318 and generate one or more symmetrical wing surface commands 305 that may be sent to the wing surfaces of the aircraft.

Figure 4:
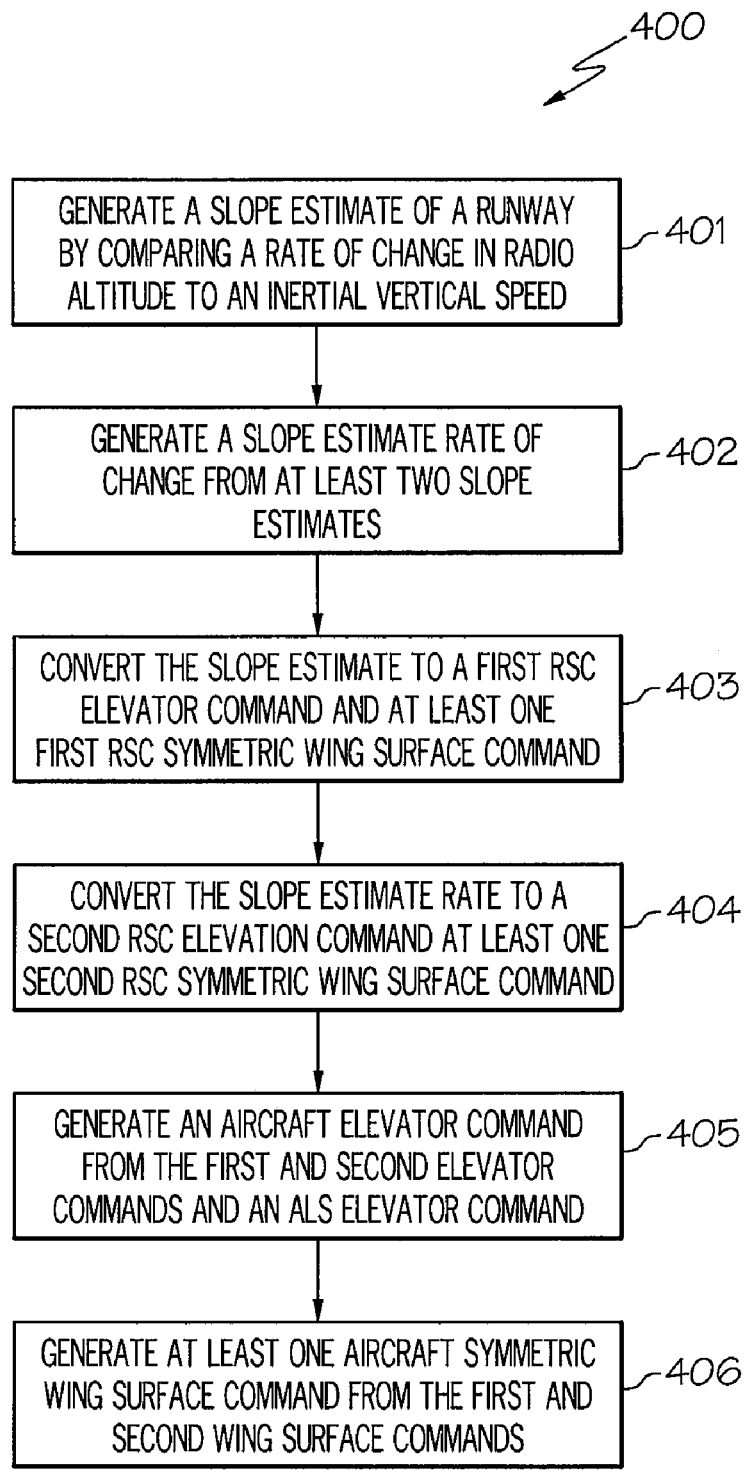
FIG. 4 is a flowchart of an example of a method for an automatic landing system according to an exemplary embodiment of the present disclosure.

FIG. 4 shows a flowchart of an example of a method 400 for an automatic landing system according to an exemplary embodiment of the present disclosure. The method 400 may be embodied in or performed by the ALS 202 in FIG. 2 and the runway slope compensation module 301 in FIG. 3. In the method 400, in block 401 a slope estimate of a runway may be generated by comparing a rate of change in radio altitude to an inertial vertical speed. In block 402, a slope estimate rate of change may be generated from at least two slope estimates. In block 403, the slope estimate may be converted to a first elevator command and one or more first symmetric wing surface commands. In block 404, the slope estimate rate may be converted to a second elevator command and one or more second symmetric wing surface commands. In block 405 an aircraft elevator command may be generated from the first elevator command and the second elevator command. In block 406 one or more aircraft symmetric wing surface commands may be generated from the one or more first symmetric wing surface commands and the one or more second symmetric wing surface commands. The generated aircraft elevator command and at least one aircraft symmetric wing surface command allow the aircraft to continue following a desired landing profile while eliminating undesirable control system responses which a sloping runway may induce in many conventional automatic landing systems.

Figure 5:
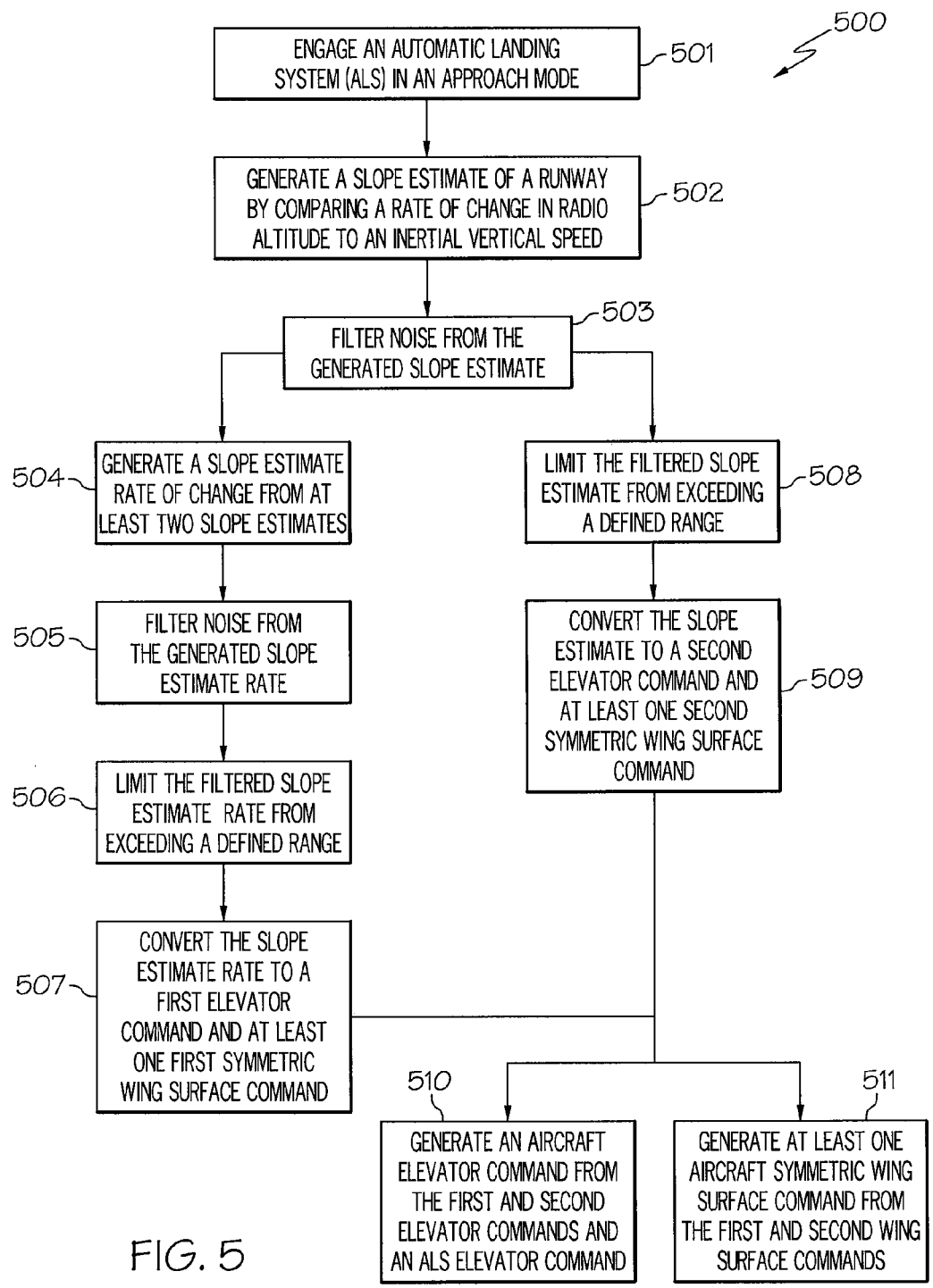
FIG. 5 is a flowchart of an example of a method for an automatic landing system according to another exemplary embodiment of the present disclosure.

FIG. 5 shows a flowchart of an example of a method for an automatic landing system according to another exemplary embodiment of the present disclosure. The method 500 may be embodied in or performed by the ALS 202 in FIG. 2 and the runway slope compensation module 301 in FIG. 3. In the method 500, in block 501, an automatic landing system may be engaged in an approach mode. In block 502, a slope estimate of a runway may be generated by comparing a rate of change in radio altitude to an inertial vertical speed. In block 503, noise from the generated slope estimate may be filtered. Then, in block 504, a slope estimate rate of change may be generated from at least two slope estimates. In block 505, noise may be filtered from the generated slope estimate rate. In block 506, the filtered slope estimate rate may be limited from exceeding a defined range. In block 507, the slope estimate rate may be converted to a first elevator command and at least one first symmetric wing surface command. Further, after filtering noise from the generated slope estimate in block 503, in block 508, the filtered slope estimate may be limited from exceeding a defined range. Then in block 509, the slope estimate may be converted to a second elevator command and at least one second symmetric wing surface command. In block 510, an aircraft elevator command may be generated from the first and second elevator commands and an ALS elevator command. In block 511, at least one aircraft symmetric wing surface command may be generated from the first wing surface command and second wing surface command.

Although specific embodiments have been illustrated and described herein, those of ordinary skill in the art appreciate that any arrangement which is calculated to achieve the same purpose may be substituted for the specific embodiments shown and that the disclosure has other applications in other environments. This application is intended to cover any adaptations or variations of the present disclosure. The following claims are in no way intended to limit the scope of the disclosure to the specific embodiments described herein.

What is claimed is:

1. An automatic landing system (ALS) comprising:
   an automatic landing module, the automatic landing module receiving a radio altitude signal from a radio altimeter and any other sensor inputs useable by the automatic landing module, and generating an ALS elevator command; and
   a runway slope compensation (RSC) module, the runway slope compensation module receiving the ALS elevator command, the radio altitude and an inertial vertical speed from an inertial reference unit, the RCS module generating an estimate of a slope of a runway based on at least the radio altitude and the inertial vertical speed, and generating an aircraft elevator command and at least one symmetric wing surface command in response to at least the estimated slope of the runway,
   wherein the aircraft elevator command and the at least one symmetric wing surface command are useable by an aircraft for runway slope compensation.

2. The ALS according to claim 1, further comprising the runway slope compensation module calculating a rate of change in the radio altitude and generating an RSC elevator command using a comparison of the rate of change in the radio altitude to the inertial vertical speed, and generating the aircraft elevator command comprising a difference between the ALS elevator command and the RSC elevator command.

3. The ALS according to claim 2, the runway slope compensation module further comprising a converter, the runway slope compensation module generating a runway slope direct lift command from the rate of change in the radio altitude and the inertial vertical speed the converter converting the runway slope direct lift command to the at least one symmetric wing surface command.

4. The ALS according to claim 1, wherein the at least one symmetric wing surface command comprises at least one of an aileron command, a flaperon command and a spoiler command.

5. The ALS according to claim 1, wherein the runway slope compensation module further comprises:
   a comparator, the comparator comparing a rate of change in the radio altitude to the inertial vertical speed, the comparison providing a slope estimate of a runway;
   a rate calculator, the rate calculator computing a rate of change of the slope estimate; and
   a converter, the converter converting the slope estimate to a first RSC elevator command and at least one first RSC symmetric wing surface command and converting the rate of change of the slope estimate to a second RSC elevator command and at least one second RSC symmetric wing surface command.

6. The ALS according to claim 5, the runway slope compensation module further comprising another rate calculator, the other rate calculator receiving the radio altitude and computing the rate of change in the radio altitude.

7. The ALS according to claim 5, the runway slope compensation module further comprising a filter, the filter filtering noise from the slope estimate and providing a filtered slope estimate to the rate calculator.

8. The ALS according to claim 7, the runway slope compensation module further comprising a limiter, the limiter receiving the filtered slope estimate and providing a limited slope estimate that is within a defined range.

9. The ALS according to claim 8, the runway slope compensation module further comprising a second filter, the second filter filtering noise from the rate of change of the slope estimate from the rate calculator and providing a filtered slope estimate rate.

10. The ALS according to claim 9, the runway slope compensation module further comprising a second limiter, the second limiter receiving the filtered slope estimate rate and providing a limited slope estimate rate that is within a defined range.

11. The ALS according to claim 10, wherein the converter further comprises a first converter and a second converter, the first converter converting the limited slope estimate into a first RSC elevator command and a first RSC direct lift command, the second converter converting the limited slope estimate rate a into and a second RSC elevator command and a second RSC direct lift command.

12. The ALS according to claim 11, the runway slope compensation module further comprising a first adder, the first adder adding the first RSC elevator command and the second RSC elevator command producing a total RSC elevator command, the RSC elevator command being usable with the ALS elevator command to generate the aircraft elevator command.

13. The ALS according to claim 12, the runway slope compensation module further comprising a second adder, the second adder adding the first RSC direct lift command and the second RSC direct lift command producing the at least one symmetric wing surface command.

14. A method for runway slope compensation comprising:
   engaging an automatic landing system (ALS) in an approach mode;

generating a slope estimate of a runway by comparing a rate of change in an altitude to an inertial vertical speed;

generating a slope estimate rate of change from at least two slope estimates of the runway;

converting the slope estimate to an aircraft elevator command and at least one symmetric wing surface command; and converting the slope estimate rate to an aircraft elevator command and at least one symmetric wing surface command.

15. The method according to claim 14, further comprising filtering noise from the generated slope estimate before generating the slope estimate rate.

16. The method according to claim 15, further comprising limiting the filtered generated slope estimate from exceeding a defined range before converting the slope estimate to an aircraft elevator command and at least one symmetric wing surface command.

17. The method according to claim 14, further comprising filtering noise from the generated slope estimate rate before converting the slope estimate rate to an aircraft elevator command and at least one symmetric wing surface command.

18. The method according to claim 17, further comprising limiting the filtered generated slope estimate rate from exceeding a defined range before converting the slope estimate rate to an aircraft elevator command and at least one symmetric wing surface command.

19. An aircraft comprising:

a radio altimeter;

an inertial reference unit; and an automatic landing system (ALS), the ALS comprising:

an automatic landing module, the automatic landing module receiving a radio altitude from the radio altimeter and any other sensor inputs for use by the ALS, and generating an ALS elevator command; and a runway slope compensation module, the runway slope compensation module receiving the ALS elevator command, the radio altitude and an inertial vertical speed from an inertial reference unit, the runway slope compensation module generating an estimate of a slope of a runway based on at least the radio altitude and the vertical speed, and generating an aircraft elevator command and at least one symmetric wing surface command in response to the estimated slope of the runway, wherein the aircraft elevator command and the at least one symmetric wing surface command are useable by the aircraft for runway slope compensation during landing approach.

20. The aircraft according to claim 19, wherein the at least one symmetric wing surface command comprises at least one of an aileron command, a flaperon command and a spoiler command.

* * * * *